United States Patent [19]
Nilsson

[11] 3,994,812
[45] Nov. 30, 1976

[54] DOUBLE BOTTOM TANK STRUCTURE WITH SLEEVED STRAINER MEANS

[75] Inventor: Bengt H. Nilsson, Skoghall, Sweden

[73] Assignee: Uddeholms Aktiebolag, Sweden

[22] Filed: July 2, 1975.

[21] Appl. No.: 592,655

[30] Foreign Application Priority Data
July 10, 1974 Sweden.............................. 7409057
Nov. 15, 1974 Sweden.............................. 7414368

[52] U.S. Cl............................ 210/172; 210/275;
210/289; 210/293; 210/474; 210/463;
210/477; 210/482
[51] Int. Cl.² ................... E03B 11/00; B01D 35/02
[58] Field of Search ........... 210/291, 293, 473, 474,
210/477, 482, 264, 265, 263, 275, 289, 292,
172

[56] References Cited
UNITED STATES PATENTS

| | | | |
|---|---|---|---|
| 2,528,062 | 10/1950 | Lances............... | 210/148 |
| 2,772,780 | 12/1956 | Penick................ | 210/292 |
| 3,081,877 | 3/1963 | Jakobs et al......... | 210/293 |
| 3,642,205 | 2/1972 | Marty................. | 210/293 |
| 3,648,731 | 3/1972 | de Boerr.............. | 210/293 |
| 3,869,381 | 3/1975 | Graveland et al.... | 210/291 |

FOREIGN PATENTS OR APPLICATIONS

| | | | |
|---|---|---|---|
| 926,950 | 5/1946 | France................ | 210/291 |
| 1,102,586 | 4/1954 | France................ | 210/291 |
| 1,219,918 | 4/1959 | France................ | 210/293 |
| 841,443 | 6/1952 | Germany............. | 210/291 |

Primary Examiner—Frank W. Lutter
Assistant Examiner—Frank Sever
Attorney, Agent, or Firm—Cushman, Darby & Cushman

[57] ABSTRACT

A tank containing a bed of particulate material, e.g. a sand filter bed or an ion exchange bed, has a bed-supporting bottom structure formed by upper and lower bottom plates rigidly connected with each other through a plurality of vertical sleeves opening into the spaces above and below the tank bottom structure. Openings in the wall of each sleeve connect the interior of the sleeve with the compartment formed between the bottom plates. A strainer unit is removably inserted in each sleeve through the lower end of the sleeve and passes liquid between the bed and the compartment between the bottom plates by way of the openings in the side wall of the sleeve.

9 Claims, 8 Drawing Figures

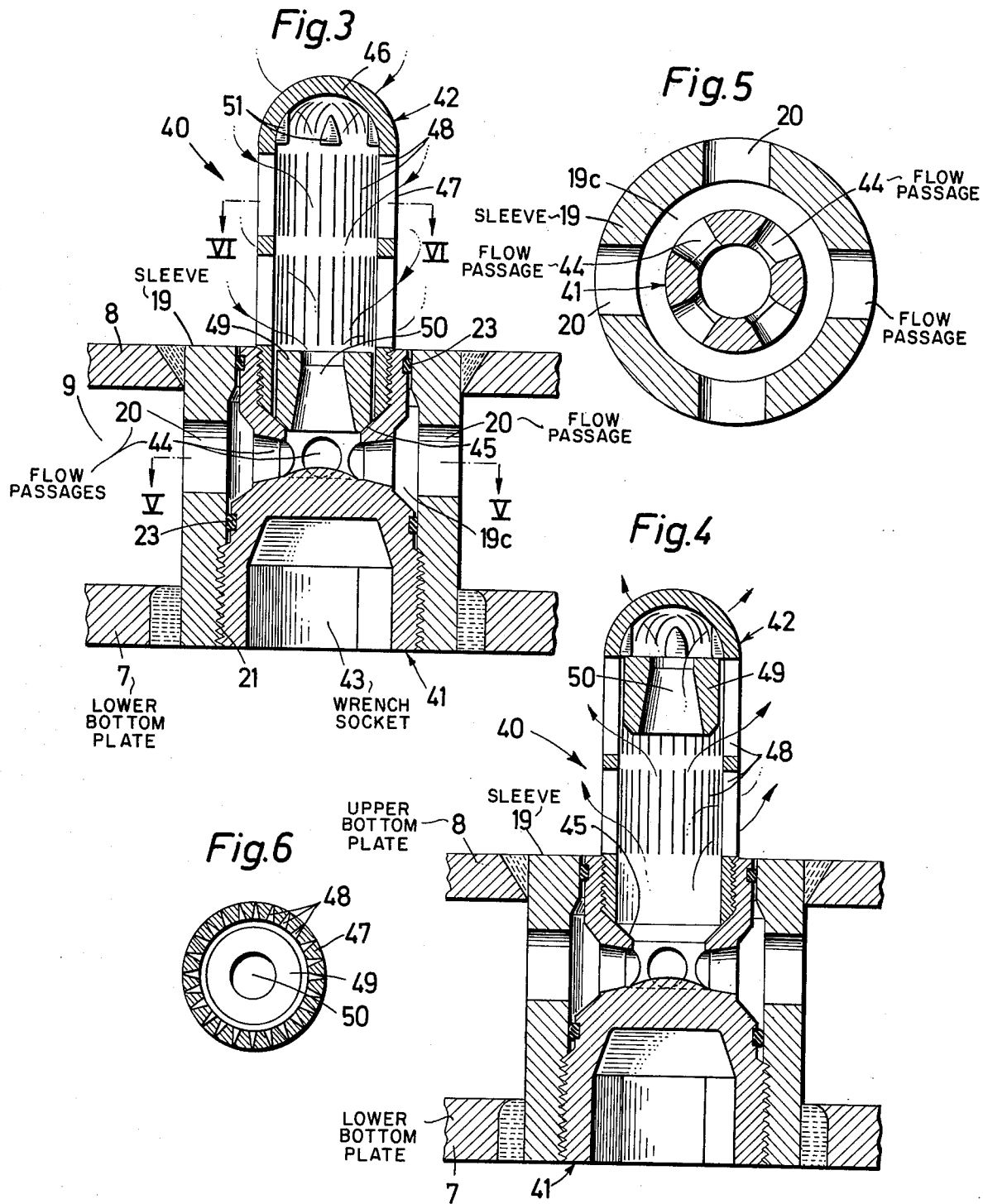

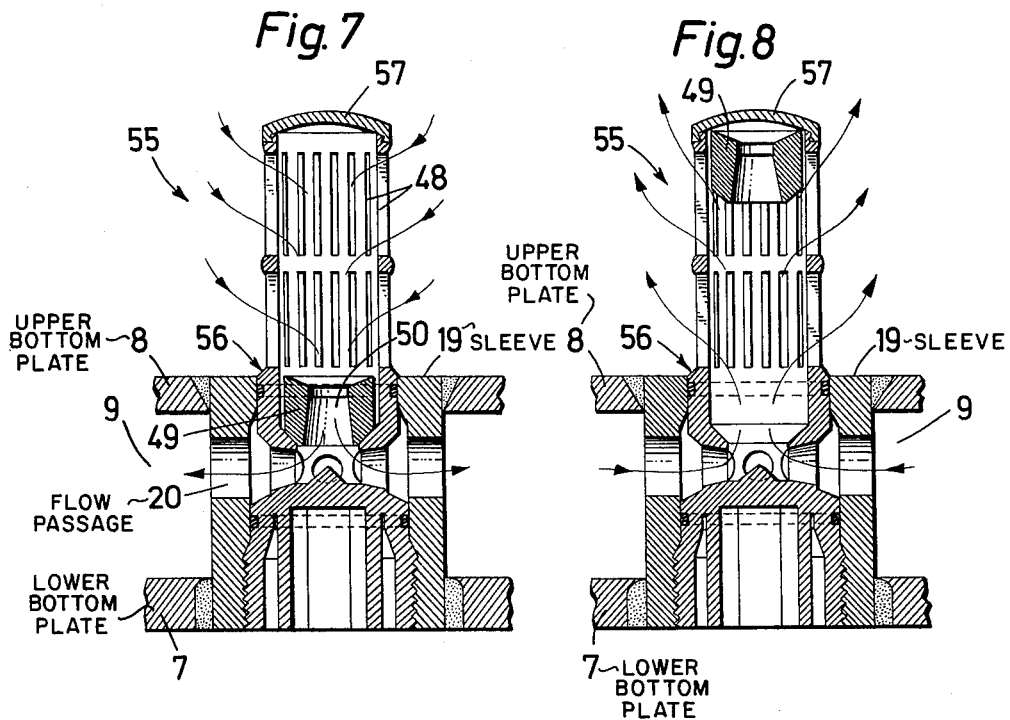

DOUBLE BOTTOM TANK STRUCTURE WITH SLEEVED STRAINER MEANS

This invention relates to a bottom structure for a tank, and more particularly to a tank bottom structure of the double-bottom type defining a bottom compartment between upper and lower bottom plates and including a plurality of strainer units through which liquid may pass between the bottom compartment and the space above the upper bottom plate.

In apparatus in which water or other liquid to be purified or subjected to some other treatment flows downwardly through a bed of particulate material in a tank, such as a sand filter container or an ion exchange column, the tank bottom structure supporting the bed often comprises upper and lower bottom plates forming between them a compartment which communicates with the bed through a plurality of strainer units on the upper bottom plate and with piping connected to the lower bottom plate. The bottom compartment is used to collect the treated liquid flowing downwardly through the bed and the strainer units. The treatment is usually carried out periodically or cyclically and the bottom compartment is also used to distribute liquid which is passed upwardly through the strainer units and the bed during the backwashing phases which alternate with treatment phases; the backwashing may serve to regenerate the bed or to remove impurities captured in the bed during the treatment phases.

In apparatus of this kind it has been difficult to gain access to the strainer units for inspection, adjustment and replacement. Thus, it has generally been necessary to shut the apparatus down and remove the bed to make the strainer units accessible from the inside of the tank.

An object of this invention is to provide a bottom structure of the kind indicated in which the strainer units are readily accessible from the outside of the tank, such as from a space below the bottom structure.

In accordance with the invention there is provided a tank bottom structure in which each strainer unit is disposed in a rigid sleeve which extends between a pair of opposing openings in the upper and lower bottom plates and is rigidly secured, e.g. welded, to the bottom plates. The interior of the sleeve communicates with the bottom compartment through one or more openings in the wall of the sleeve, and the strainer unit has a flow passage which communicates with the bed-containing space above the upper bottom plate through a strainer element and with the opening or openings in the wall of the sleeve. The strainer unit can be inserted in and removed from the sleeve through the lower end of the sleeve.

Since the strainer units can thus be readily inspected, adjusted, cleaned and replaced, one can expect that all or almost all strainer units will always function properly at any given time. Consequently, there is no need to provide the strainer units in a number much in excess of the number of properly functioning strainer units that are required to ensure an adequate and sufficiently uniform flow through the bed. This means that the costs can be reduced or that more expensive materials, such as acid-resistant steel, can be used without increasing the costs to an unacceptable level.

Another advantage of the tank bottom structure according to the invention is that the two spaced bottom plates and the several rigidly fastened to the plates form a framework construction which is capable of supporting heavy beds, even if the plates are thin and/or spaced apart only by a small distance. This means that the material economy can be improved still further while at the same time reducing the volume of the bottom compartment and, accordingly, reducing the so-called "tail-effects" occurring on switching between treatment and backwashing phases or on switching from one liquid to be treated to another. These tail effects are caused by liquid remaining in the bottom compartment at the time the switching is effected.

Other objects, features and advantages will appear from the following description of exemplary embodiments shown in the accompanying drawings.

FIG. 3 is a view corresponding to FIG. 2 showing an alternative embodiment of a strainer unit of the tank bottom structure, a restrictor body of the strainer unit being illustrated in a first operating position;

FIG. 4 is a view similar to FIG. 3 but showing the restrictor body in a second operating position;

FIG. 5 and FIG. 6 are horizontal sectional views taken respectively on line V—V and VI—VI of FIG. 3;

FIG. 7 and 8 are sectional views corresponding respectively to FIG. 3 and FIG. 4 and showing a modified strainer unit.

Figure 1:
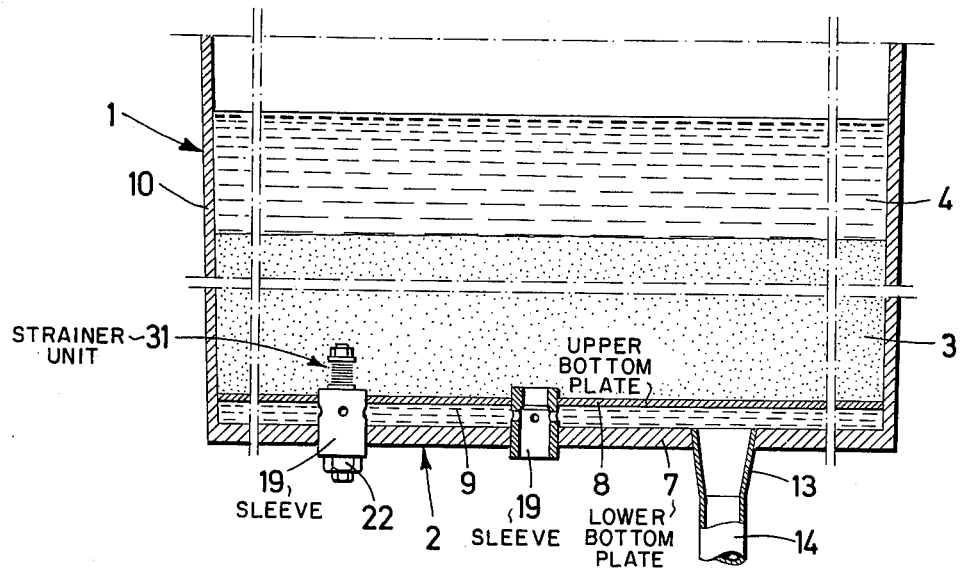
FIG. 1 is a fragmentary vertical sectional view of a tank having a bottom structure embodying the invention.

FIG. 1 shows a portion of a tank forming part of a waste-water treating apparatus. This tank is pressure-tight and includes conduits, not shown, for supplying the waste-water to be treated, for withdrawing treated water, for supplying backwash liquid and for removing the used backwash liquid and washed-off material. The tank 1 includes a cylindrical wall 10 and a bottom structure 2, and it is with this bottom structure the invention is primarily concerned. It forms a support for a sand filter or other bed 3 of powdery or granular material through which the waste-water 4 to be treated is caused to flow downwardly.

The tank bottom structure 2, which is circular in plan view, comprises two steel plates 7 and 8 which are flat in the illustrated embodiment but which may alternatively be dished upwardly or downwardly. Regardless of their shape, they are preferably parallel, that is, spaced by a substantially constant distance over the major portion of their area, and placed relatively close to each other so that the volume of the compartment 9 defined between them, hereinafter termed bottom compartment, is small compared with the volume occupied by the bed 3; a preferred maximum ratio of the two volumes is 1:10.

The lower bottom plate 7 has a multiplicity of substantially uniformly distributed circular openings 7a, only two such openings being shown in FIG. 1. The upper bottom plate 8 has similar openings 8a, each such opening being aligned with, that is directly opposing, one of the openings 7a. Through each pair of opposing openings 7a and 8a extends a cylindrical steel sleeve 19 formed by a short length of tubing. The sleeve 19 has its opposite end portions 19a and 19b welded to the two bottom plates 7 and 8 in a fluid-tight manner around the perimeter of the openings 7a and 8a, see FIG. 2. The two spaced bottom plates 7 and 8 and the welded sleeves 19 thus form a framework construction characterized by high load-carrying capacity.

Each sleeve 19 has four lateral openings 20 providing constant open communication between the interior of the sleeve and the bottom compartment 9. Liquid can thus flow between the bed-accommodating space of the tank above the upper bottom plate 8 and the bottom compartment through these openings 20.

Figure 2:
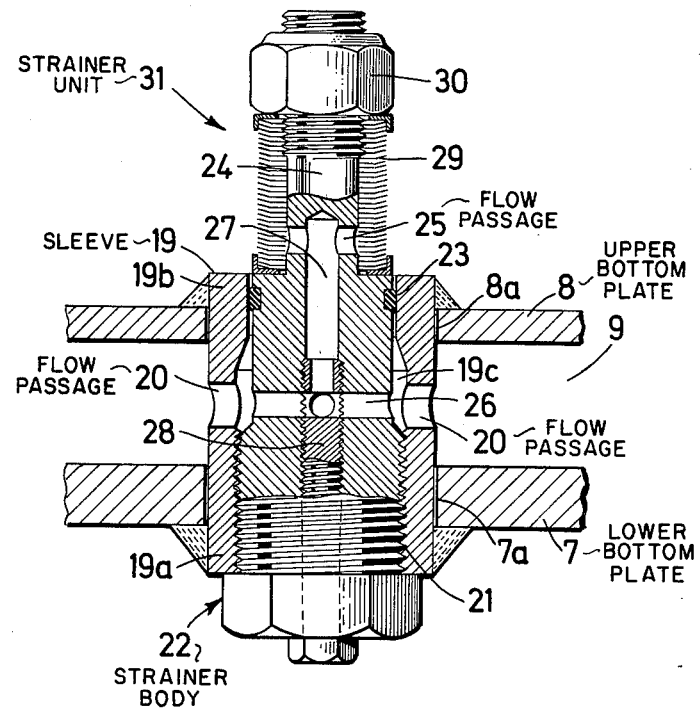
FIG. 2 is an enlarged vertical sectional view of a portion of the bottom structure shown in FIG. 1.

The upper end portion 19b of each sleeve 19 has a smaller inner diameter than the lower end portion 19a which is internally threaded as shown at 21 in FIG. 2. The inner surface of the sleeve forms an annular recess 19c in the region of the four openings 20.

A strainer body 22, the lower portion of which is externally threaded, is screwed into each sleeve 19 from below and closes the lower end of the sleeve in a fluid-tight manner (in FIG. 1, the strainer body is omitted from one of the sleeves). The upper end portion of the strainer body 22 is provided with an O-ring seal 23 sealingly engaging the inner surface of the upper end portion 19b of the sleeve. A neck 24 of the strainer body 22 projects upwardly beyond the upper end of the sleeve and is provided with external threads.

A transverse through passage 25 is formed in the neck 24, and two additional intersecting transverse through passages 26 are formed in the strainer body in the region of the annular recess 19c. An axial passage 27 extends between the transverse passage 25 and the two transverse passages 26. A threaded valve member 28 screwed into the internally threaded lower portion of the axial passage 27 serves to control the flow of liquid through the passage 27 between the passages 25 and 26.

A strainer element 29, formed by a helically wound strip, is disposed around the neck 24 of the strainer body 22 and is held in position by a nut 30. The maximum transverse dimension of the strainer element 29 and of the nut 30 is less than the smallest inner diameter of the sleeve 19. The strainer body 22 and the strainer element 29 form a strainer unit generally designated 31 through which liquid can flow both downwardly from the bed 3 to the bottom compartment 9 and upwardly from the bottom compartment 9 to the bed, the flow being controllable by means of the valve member 28. As best shown in FIG. 2, the strainer unit 31 can be screwed into and out of the sleeve without there being any need for access to the bed-accommodating space above the tank bottom structure 2. Thus, adjustments, maintenance and replacement of all strainer units 31 can be carried out from below the tank bottom structure 2.

In other words, the upper bottom plate 8 is arranged above the lower bottom plate 7 with spacing vertically therebetween to provide a bottom compartment 9. A first plurality of openings 8a is provided through the plate 8 and a second plurality of openings 7a is provided through the plate 7. Respective openings 8a and 7a are in vertical alignment to provide pairs of openings 8a, 7a. Each pair of openings 8a, 7a has a tubular sleeve 19 extending therebetween. Securement means shown as weld material adjacent ends 19a and 19b circumferentially secure the sleeves 19 to the plates 8 and 7 perimetrically of the openings 8a, 7a. Each tubular sleeve 19 has at least one opening 20 laterally therethrough between the plates 8 and 7. Each tubular sleeve 19 is paired with a strainer unit 31 in the sense that one strainer unit 31 is received in each tubular sleeve 19 through the open lower end of the latter. Each strainer unit has an element 29 capable of straining fluid which may endeavor to pass therethrough, interposed in a fluid passage 26, 27, 25 of each strainer unit. One of the two opposite ends of each fluid passage 26, 27, 25 is thus open above the plate 8, i.e. at the strainer element 29 exterior and the opposite end is at 26, for communicating with the bottom compartment 9 via the flow passage 20. Cooperating, disengageable securement means in the form of internal and external threads are respectively provided at 21, for removably securing the strainer units in the respective tubular sleeves. The strainer body 22 of each strainer unit closes the open lower end of the respective tubular sleeve 19. The O-ring seal 23 circumferentially seals between the strainer unit 31 and the tubular sleeve 19 of each strainer unit/tubular sleeve pair 31, 19, above the respective opening 20.

Since the strainer units 31 are always easily accessible and replaceable, it is possible to ensure that all or almost all strainer units function properly at any given time. Thus, there is no need to provide the strainer units in a number that is much in excess of the number of properly functioning units required to ensure that the bed will pass the anticipated flow of liquid and that this flow is distributed over the cross-section of the bed with sufficient uniformity.

For draining the treated liquid collected in the bottom compartment 9 as well as for supplying backwash liquid to the bottom compartment 9, the lower bottom plate 7 has a number of additional circular openings 32. A conical tubular connector 13 is welded to the lower bottom plate 7 around each opening 32 and communicates with a drain conduit, not shown, through a tube 14. The tube 14 also serves to feed backwash liquid to the bottom compartment 9 during the backwashing phases.

In operation of the tank 1, the water 4 to be treated percolates through the bed 3 and is collected in the bottom compartment 9 through the strainer units 31 and is then discharged through the tubes 14. Backwash fluid (liquid and air) is fed to the bottom compartment through the tubes 14 and enters the bottom compartment 9 from which it is distributed over the cross-section of the bed by the strainer units 31, which thus serve as nozzle units during the backwash phases.

As is apparent from the foregoing description, the invention is not restricted to any particular type or shape of the tank provided with the bottom structure according to the invention. Thus, the term "tank" as used in this specification is to be understood as embracing many different types of vessels or containers suitable for containing a bed of particulate material.

In use of the tank 1 it is often desirable that the backwash flow is substantially greater than the liquid flow through the bed during the treatment phases. The embodiments of the strainer units shown in FIGS. 3 to 8 permit an increase of the liquid flow during the backwash phases by increasing the cross-sectional flow area on switching from the treatment phases to the backwashing phases.

In FIGS. 3 to 8, those parts which are identical with or similar to the parts of the embodiment shown in FIG. 2 bear the same reference numerals as in FIG. 2. The two embodiments shown in FIGS. 3 to 8 differ from the embodiment shown in FIG. 2 only in respect of the strainer units.

Referring first to FIGS. 3 and 4, the strainer unit 40 comprises an externally threaded strainer body 41 screwed into the sleeve 19, which is provided with internal threads 21 in the lower portion, and a strainer element 42 screwed into the upper portion of the strainer body 41. The lower end of the strainer body 41 has a hexagonal wrench socket 43. A pair of O-rings 23 provide a fluid-tight seal between the outer surface of the strainer body and the inner surface of the sleeve 9. Between the two O-rings 23 the strainer body 41 has a waist portion in which two diametral intersecting passages 44 are provided, which open into the annular recess 19c and into a circular opening defined by an upwardly facing annular seat surface 45.

The strainer element 42 is shaped like a tubular cap having a rounded top wall 46 and a cylindrical side wall 47. Both walls are provided with a large number of circumferentially distributed narrow slits 48. Within the strainer element 42 there is a tubular restrictor body 49 the lower end of which has an annular face adapted to sealingly engage the seat surface 45 as shown in FIG. 3. A calibrated opening 50 extends axially through the restrictor body 49 and in the position of the restrictor body shown in FIG. 3 forms the only path on which liquid can flow between the passages 44 and the slits 48.

The restrictor body 49 is coaxial with, and has a slight clearance to, the inner surface of the strainer element 42. It is displaceable axially, that is, in the vertical direction, in the strainer element from the position defined by the seat surface 45 (FIG. 3) to a position adjacent the top wall 46 defined by a number of lugs 51, see FIG. 4. As is apparent FIG. 4, the restrictor body 49 in the upper position causes no or only a very small restricting action on the upward flow of liquid through the strainer unit.

During the treatment phase the restrictor body 49 is in the lower position shown in FIG. 3, in which it substantially restricts the downward flow of treated liquid through the strainer unit. On switching to the backwashing phase, the direction of flow of the liquid is reversed, so that the liquid pushes the restrictor body to the upper position shown in FIG. 4 in which almost all liquid bypasses the restrictor body. On switching back to the treatment phase, the restrictor body is returned to the lower position by gravity. The repeated movements up and down of the restrictor body also reduces the tendency of the slits 48 to become clogged.

By suitably selecting the dimensions of the easily replaceable restrictor body 49, the rate of flow and the pressure drop of the downward flow which are desired in each particular case can easily be achieved. By using differently sized restrictor bodies 49 at different location in one and the same bottom structure, a uniform distribution of the liquid flow can be achieved.

The restrictor body 49 as well as the strainer body 41 and the strainer element 42 are suitable made of plastics, although acid-resistant steel or other materials may also be used.

The modified strainer unit 55 shown in FIGS. 7 and 8 differs from the strainer unit 40 of FIGS. 3 to 5 only in that the strainer body and the strainer element are made as an integral part 56. The upper end of the cylindrical strainer element is closed by a cover 57 which defines the upper, bypassing position of the restrictor body 49. Apart from these differences the strainer unit 55 is practically identical with the strainer unit 40.

What is claimed is:

1. In combination with a tank for containing a fluid, a bottom structure, comprising:
   a. an upper bottom plate;
   b. a lower bottom plate;
   c. said upper bottom plate being arranged above said lower bottom plate with spacing vertically therebetween respectively to provide the upper and lower limits of a bottom compartment for said tank;
   d. a first plurality of openings through the upper bottom plate;
   e. a second plurality of openings through the lower bottom plate;
   f. respective ones among said first and second plurality of openings being in vertical alignment to provide pairs of said openings;
   g. a plurality of generally vertically oriented tubular sleeves;
   h. each tubular sleeve of said plurality of tubular sleeves having means defining an open upper end and means defining an open lower end;
   i. each tubular sleeve of said plurality of tubular sleeves extending between the individuals of a respective pair of said pairs of said openings;
   j. securement means rigidly cicumferentially securing each said tubular sleeve to said upper bottom plate and to said lower plate perimetrically of the respective of said openings, that is, the respective particular said individuals of the said openings between which each such tubular sleeve extends;
   k. means defining at least one opening laterally through each said tubular sleeve between said upper bottom plate and said lower bottom plate;
   l. a plurality of strainer units;
   m. each strainer unit of said plurality of strainer units including means defining a fluid passage passing through said each strainer unit and having two opposite ends; an element for straining fluid being interposed in said fluid passage between said two opposite ends of said fluid passage, to serve a desired result of straining such fluid passing through said fluid passage between said two opposite ends of said fluid passage;
   n. said plurality of strainer units corresponding in number to said plurality of tubular sleeves, so that respective individuals of the plurality of strainer units are paired with respective individuals of the plurality of tubular sleeves;
   o. said respective individuals of the plurality of strainer units being, in fact, paired with said respective individuals of the plurality of tubular sleeves to provide respective strainer unit/tubular sleeve pairs;
   p. said strainer unit of each said strainer unit/tubular sleeve pair being sized to be received in said tubular sleeve of a corresponding said respective strainer unit/tubular sleeve pair through said open lower end of said tubular sleeve of the corresponding said respective strainer unit;
   q. said strainer unit of each said strainer unit/tubular sleeve pair being, in fact, received in said tubular sleeve of the corresponding said respective strainer unit/tubular sleeve pair through said open lower end of said tubular sleeve of the corresponding said respective strainer unit,
   r. cooperating, disengageable securement means on said strainer unit of each strainer unit/tubular sleeve pair and said tubular sleeve of each strainer unit/tubular sleeve pair, securing said strainer unit of each strainer unit/tubular sleeve pair to said tubular sleeve of each strainer unit/tubular sleeve pair, within each respective strainer unit/tubular sleeve pair of said strainer unit/tubular sleeve pairs to maintain the respective strainer units removably received in the respective tubular sleeves;

s. said fluid passage of said strainer unit having one of said two opposite ends of said fluid passage being open to said bottom compartment above said upper bottom plate;

t. said fluid passage of each strainer unit having the other of said two opposite ends of said fluid passage spatially arranged to open into said bottom compartment via the respective said at least one opening laterally through the respective of each said tubular sleeve;

u. each strainer unit including means closing the open lower end of the respective tubular sleeve with which said each strainer unit is paired in each said strainer unit/tubular sleeve pair; and v. further including sealing means circumferentially sealing between the strainer unit and tubular sleeve of each said strainer unit/tubular sleeve pair, above the respective said at least one opening laterally through the respective of each said tubular sleeve.

2. Bottom structure according to claim 1 in which the lower end portion of the sleeve is internally threaded and the strainer unit is externally threaded and screwed into the lower end portion of the sleeve from the lower end thereof.

3. Bottom structure according to claim 1 in which the strainer element of the strainer unit projects above the upper bottom plate.

4. Bottom structure according to claim 1 in which the outer surface of each end portion of the sleeve has a sealing relationship with the upper and lower bottom plates around the pair of openings and the inner surface of each end portion of the sleeve has a sealing relationship with the strainer unit.

5. Bottom structure according to claim 1 in which that the strainer unit includes a manually adjustable valve member for controlling the flow of fluid through flow passage.

6. Bottom structure according to claim 1 in which the strainer unit includes a flow restrictor displaceable between first and second positions, the flow restrictor reducing the resistance to fluid flow through the strainer unit when displaced from the first position to the second position.

7. Bottom structure according to claim 6 in which the flow restrictor is displaceable from the first position to the second position by fluid flowing from the bottom compartment and the openings in the wall of the sleeve and through the flow passage of the strainer unit.

8. Bottom structure according to claim 7 in which the flow restrictor comprises a body which is vertically displaceable in the strainer element and which in the first position defines a section of the flow passage and in the second position is in bypassing relationship with the flow passage.

9. Bottom structure according to claim 8 in which the restrictor body has a calibrated opening therethrough which defines said section of the flow passage when the restrictor body is in the second position.

* * * * *